(12) United States Patent
Hashima et al.

(10) Patent No.: US 7,480,596 B2
(45) Date of Patent: Jan. 20, 2009

(54) HARNESS DESIGN SUPPORTING APPARATUS AND METHOD, AND COMPUTER READABLE RECORDING MEDIUM WHICH STORES HARNESS DESIGN SUPPORTING PROGRAM THEREIN

(75) Inventors: Masayoshi Hashima, Kawasaki (JP); Yuichi Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 673 days.

(21) Appl. No.: 11/032,160

(22) Filed: Jan. 11, 2005

(65) Prior Publication Data
US 2005/0119773 A1    Jun. 2, 2005

Related U.S. Application Data

(63) Continuation of application No. PCT/JP02/09466, filed on Sep. 13, 2002.

(51) Int. Cl.
*G06F 17/50* (2006.01)

(52) U.S. Cl. .................................. 703/1; 703/2; 703/7
(58) Field of Classification Search .................... 703/1, 703/2, 6, 7; 73/783
See application file for complete search history.

(56) References Cited

U.S. PATENT DOCUMENTS

| | | | | |
|---|---|---|---|---|
| 6,224,249 | B1 | 5/2001 | Ozawa et al. | 364/512 |
| 7,206,723 | B2 * | 4/2007 | Sawai et al. | 703/1 |
| 2004/0130878 | A1 * | 7/2004 | Sawai et al. | 361/826 |
| 2004/0167752 | A1 * | 8/2004 | Sawai | 703/1 |

FOREIGN PATENT DOCUMENTS

| | | |
|---|---|---|
| JP | 6-103345 | 4/1994 |
| JP | 2002-73701 | 3/2002 |
| JP | 2002-231074 | 8/2002 |

OTHER PUBLICATIONS

Swingler et al., J. Degradation of Road Tested Automotive Connectors, IEEE Transactions on Components and Packaging Technologies, vol. 23, No. 1, Mar. 2000, pp. 157-164.*
Bravo et al., J. An Application of Robotic Cable Harness Bundling, IEEE International Conference on Robotics and Automation, vol. 3, Apr. 1986, pp. 1931-1935.*
Zuken Inc., "Cabling Designer", web page printout indicated web page updated Jan. 5, 2004, URL:http://www.zuken.co.jp/sd/cabling/cabling.htm.
EDS Corp., "I-DEAS Harness Design", copyright notice dated 2001, URL:http://www.sdrc.com/ideas/appl-prod/harness.html.

* cited by examiner

*Primary Examiner*—Russell Frejd
(74) *Attorney, Agent, or Firm*—Staas & Halsey LLP

(57) ABSTRACT

The object is to provide an environment in which dynamic verification of harness design is available, and thereby realizing efficient harness design. The apparatus comprises: a mechanism information storing unit which stores in advance three-dimensional model data of a mechanical component, other than the harness, of the object apparatus; a harness information setting section which sets harness information; a simulation section which creates a three-dimensional mechanism model of the harness and of the mechanical component based on the harness information and on the three-dimensional model data of the mechanical component, and which simulates motion of the harness in conjunction with motion of the mechanical component using the three-dimensional mechanism model; a display; and a display controlling section which controls the display to show thereon the simulation result obtained by the simulation section.

20 Claims, 7 Drawing Sheets

HARNESS DESIGN SUPPORTING APPARATUS AND METHOD, AND COMPUTER READABLE RECORDING MEDIUM WHICH STORES HARNESS DESIGN SUPPORTING PROGRAM THEREIN

This application is a continuation application, filed under 35 USC 111(a), of International Application PCT/JP2002/009466, filed Sep. 13, 2002.

BACKGROUND OF THE INVENTION

1. Field of the Invention

The present invention relates to technology for supporting design of a harness. The invention relates particularly to technology for realizing efficient harness design, such as installation position of a harness and design of a harness for its manufacturing, at designing and developing apparatus (for example, printers, automobiles, machine tools, industrial robots, and so on) in which a harness is incorporated. The "harness" in the present invention includes flexible and pliable belt-like and line-like members and bundles of such members, such as wiring incorporated in apparatus, cables, wires, piping and rubber hoses. The present invention is applied to placement design of such members.

2. Description of the Related Art

Generally speaking, when apparatus, such as printers, automobiles, machine tools, and industrial robots, in which harnesses are incorporated are designed, both the mechanical and electrical systems of the apparatus are designed to some extent, and then, harnesses which are placed between components forming the apparatus are designed, and installing positions and placement positions of the harnesses are determined.

This is because what kind of wiring should be placed where in the apparatus cannot be determined until design of the mechanical and electrical systems are completed to some extent, and for this reason, design of harnesses tends to be left until later. In reality, a harness is actually incorporated in a product prototype to adjust the length of the harness, so that problems related to the harness are not revealed quite a late stage.

Recently, a system has been developed in which a three-dimensional model designed by a three-dimensional CAD (Computer Aided Design) is used in placement design of a harness, to find problems of the harness as much as possible during the design process. The following are typical systems:

(1) "Embassy": Linius Corp.
(2) "Cabling Designer": Zuken Inc.
(3) "I-DEAS Harness Design": EDS Corp.

In these systems, three dimensional models of harnesses are designed on a three-dimensional CAD or using CAD data.

However, since three-dimensional CAD data can only express static assembly conditions, the above systems cannot verify problems of harnesses relating to motion of movable mechanical components.

More specifically, the following problems are considerable in an apparatus in which a harness is incorporated. A harness placed near a door is caught in the door when the door opens/closes; a harness which is linked to a linear mechanism is too short to follow motion of the linear mechanism; a harness which is linked to a rotational mechanism interferes with adjacent mechanical components. At design of a harness, verification needs to be performed to check that the above problems do not occur, which verification cannot be realized in the above systems.

In addition, since harness models designed on a three-dimensional CAD are solid models, whose calculation is time-consuming, they present problems in operability. In particular, in the above "EMbassy", data written in VRML (Virtual Reality Modeling Language) is treated, and use of such data raises a problem of increasing display processing time.

With the foregoing problems in view, an object of the present invention is to make it possible to check motion of a harness in real time at harness design, without increasing the amount of processing, thereby providing an environment in which dynamic verification of harness design is available, and realizing efficient harness design.

DISCLOSURE OF THE INVENTION

In order to accomplish the above object, according to the present invention, there is provided a harness design supporting apparatus for supporting placement design of a harness which is to be incorporated in an object apparatus, the apparatus comprising: a mechanism information storing unit which stores in advance three-dimensional model data of a mechanical component, other than the harness, of the object apparatus; a harness information setting section which sets information about the harness as harness information; a simulation section which creates a three-dimensional mechanism model of the harness and of the mechanical component based on the harness information, which is set by the harness information setting section, and on the three-dimensional model data of the mechanical component stored in the mechanism information storing unit, and which simulates motion of the harness in conjunction with motion of the mechanical component using the three-dimensional mechanism model; a display which displays motion of the harness and motion of the mechanical component; and a display controlling section which controls the display to show thereon the simulation result obtained by the simulation section as motion of the harness and motion of the mechanical component.

As a generic feature, there is provided a harness design supporting method for supporting placement design of a harness which is to be incorporated in an object apparatus, the harness design supporting method comprising: storing in advance three-dimensional model data of a mechanical component, other than the harness, of the object apparatus; setting information about the harness as harness information; simulating motion of the harness in conjunction with motion of the mechanical component using a three-dimensional mechanism model of the harness and of the mechanical component, which model is created based on the harness information and on the three-dimensional model data of the mechanical component; and displaying the simulation result on a display as motion of the harness and motion of the mechanical component.

As another generic feature, there is provided a harness design supporting program for a computer to support placement design of a harness which is to be incorporated in an object apparatus, wherein the program instructs the computer to function as the following: a harness information setting section; a simulation section; and a display controlling section. In addition, there is provided a computer-readable recording medium which stores therein the harness design supporting program.

According to the harness design supporting apparatus and method, and the recording medium storing harness design supporting program therein, the following effects and benefits are realized. Using a three-dimensional mechanism model created based on the harness information and the three-dimensional model data of mechanical components, motion of the harness is simulated in conjunction with motion of the mechanical components, and the simulation result is shown on the display as motion of the harness and motion of the mechanical components. Thus, at design of the harness, it is possible for a designer to check in real time the motion of the harness accompanying the motion of the mechanical components, without causing an increase in the amount of processing. This provides the designer with an environment where dynamic verification of harness design is available, so that efficiency of harness design is improved.

A harness is treated as a three-dimensional model in which multiple harness parts are linked by three-degree-of-freedom rotational joints, and this makes it possible to treat the harness as a simple three-dimensional model. Accordingly, motion of the harness accompanying the motion of the mechanical components is simulated in a simple manner, so that the motion of the harness is simulated in real time without increasing the amount of processing. Further, since the motion of the harness is shown in real time as a three-dimensional image on the display, the designer can see the motion of the harness in real time in a three-dimensional manner, so that his understanding of the harness is improved.

Use of the starting and terminating positions of the harness and attitude of the harness at these positions, contained in the harness information, facilitates calculation of the position and the shape of the harness. In particular, by approximating the position and the shape of the harness by a Bezier curve, it is possible to obtain the position and the shape of the harness more easily in a shorter time. Further, by connecting harness parts, which form a three-dimensional model of the harness, so that they are arranged along the obtained Bezier curve, a three dimensional image of a harness is created extremely easily in a short time.

DESCRIPTION OF THE PREFERRED EMBODIMENT(S)

One preferred embodiment of the present invention will now be described with reference to the relevant accompanying drawings.

[1] Construction of a Harness Design Supporting Apparatus

Figure 1:
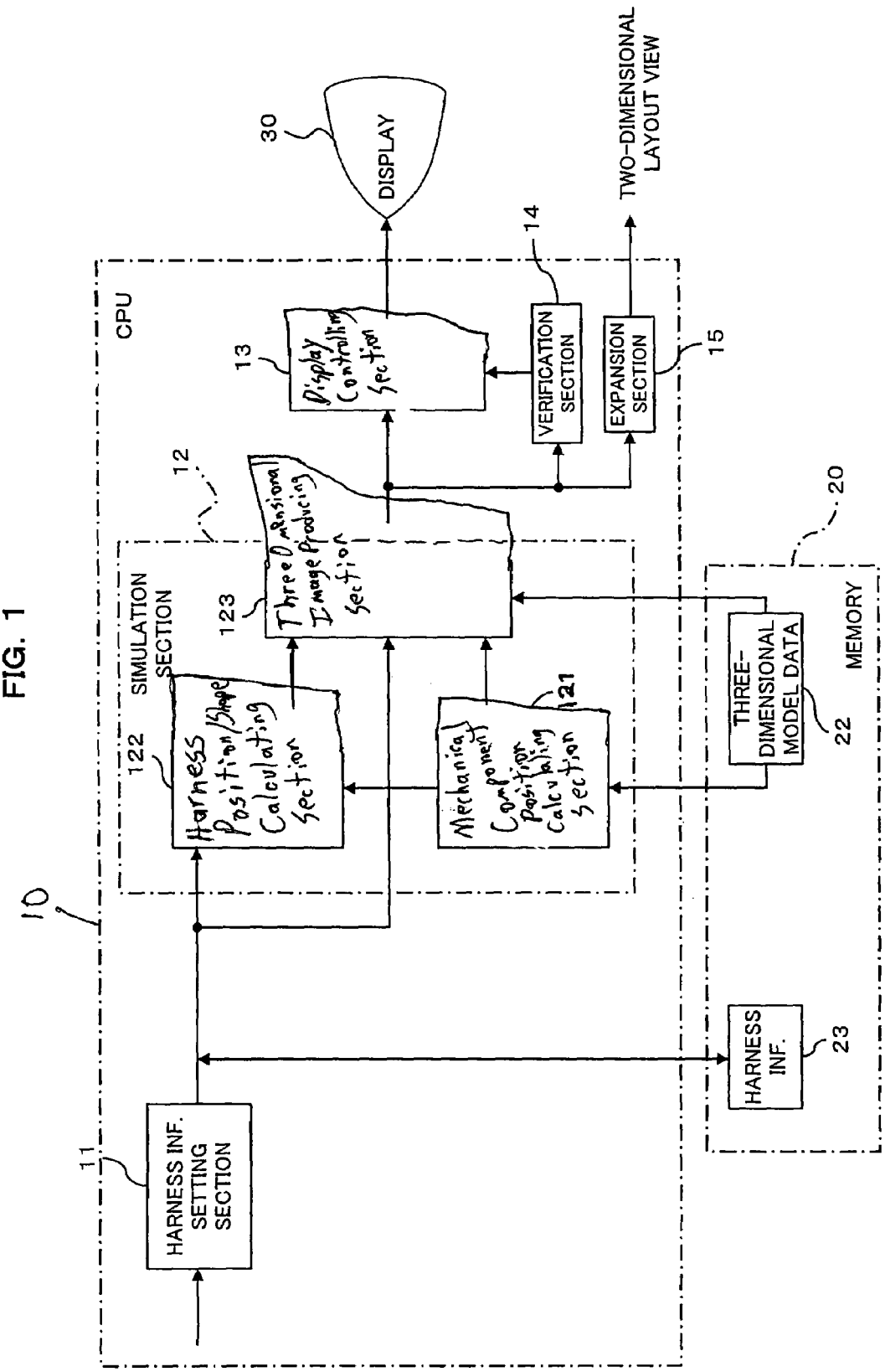
FIG. 1 is a block diagram showing a functional construction of a harness design supporting apparatus according to one preferred embodiment of the present invention.
Figure 2:
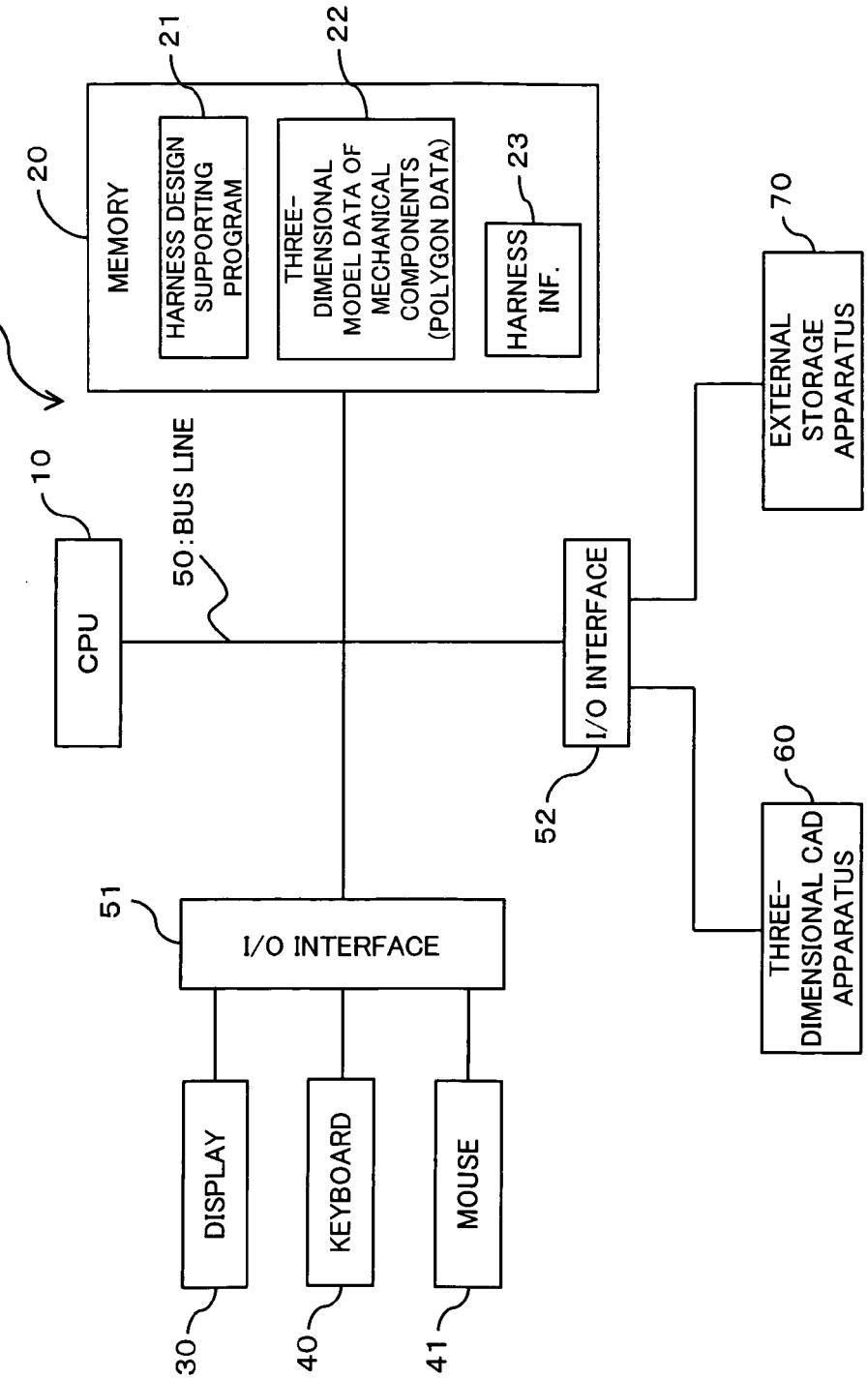
FIG. 2 is a block diagram showing a hardware construction of a computer system for realizing the harness design supporting apparatus of FIG. 1.

FIG. 1 is a block diagram showing a functional construction of a harness design supporting apparatus according to one preferred embodiment of the present invention; FIG. 2 is a block diagram showing a hardware construction of a computer system for realizing the harness design supporting apparatus of FIG. 1.

The computer system (for example, a personal computer) 1 of FIG. 1 and FIG. 2 of the present embodiment serves as an apparatus that supports placement design of a harness in an object apparatus (for example, a printer, an automobile, a machine tool, an industrial robot, and so on), in which a harness is to be incorporated.

Here, the "harness" includes flexible and pliable belt-like and line-like members and bundles of such members, such as wiring for supplying electric power or signals, cables, wires, piping and rubber hoses. Both ends of the harness are connected/secured to connector components, which are mechanical components of the object apparatus. Further, clamp components can clamp some parts of the harness, other than the ends thereof, for locating and securing of the harness.

As shown in FIG. 2, the computer system 1 includes a CPU 10 and a bus line 50 connected to the CPU 10. A memory (ROM, RAM, etc.) 20 is connected to the bus line 50, and a display (for example, CRT, LCD, or PDP, etc.) 30, a keyboard 40, and a mouse 41, are also connected to the bus line 50 via an I/O interface 51. Further, a three-dimensional CAD apparatus 60 and an external storage apparatus 70 are connected to the bus line 50 via an I/O interface 52.

Here, the memory 20 (or external storage apparatus 70) stores an application program (harness design supporting program) 21 (will be detailed later) therein. The memory 20, which stores three-dimensional model data (polygon data) 22 of mechanical components and harness information 23 therein, also functions as a working memory which is used when the CPU 10 executes an application program 21.

The display 30 is under control of the CPU 10 (the function as a display controlling section 14), and it shows thereon motion of the harness and motion of mechanical components as a result of simulation performed by the CPU 10 [the function as a simulation section 12 (will be detailed later)].

The keyboard 40 and the mouse (pointing device) 41 are operated by an operator (user) who refers to a screen image shown on the display 30, and are used to input various instructions and various information to the CPU 10 (computer system 1). In the present embodiment, these devices are used to input harness information 23 and to operate the shape of the harness shown on the screen of the display 30.

At this time, the harness information 23, which includes the starting and terminating positions of a harness, attitude (vector information) of the harness, the length of the harness, the shape of the cross section of the harness, curvature information of the harness, and harness modeling information (multiple connection structure data: various types of data used for modeling a harness as a set of small harness parts), is input through the keyboard 40 to the CPU 10 [a harness information setting section 11 (will be detailed later)].

Further, the mouse 41 is used to drag a three-dimensional image of a harness shown on the display 30, thereby changing the shape of the harness. Moreover, the mouse 41 is also used to drag three-dimensional images of mechanical components, whereby the amount of operation and the direction of operation of the mechanical components are input to the CPU 10 [a simulation unit 13 (will be described later)].

The three-dimensional CAD apparatus 60 designs other mechanical components than a harness of the object apparatus. The three-dimensional model data 22 of such mechanical components, which is a result of design by the three-dimensional CAD apparatus 60, is converted into polygon data, and is then stored in advance in the memory (mechanism information storing unit) 20 via the I/O interface 52 and the bus line 50.

The external storage apparatus 70 may store the application program 21 and the harness information 23. However, the present embodiment prepares in advance a library which stores information about connector components, to which a harness is to be connected, together with information about to which part of each connector component the harness is to be connected and with information about attitude of the harness in that position, and also a library which stores information about clamp components, which clamp the harness, together with information about to which part of each clamp component the harness is to be secured and with information about attitude of the harness in that position. The external storage apparatus 70 is used to store the above libraries therein.

The memory 20 stores an application program (a harness design supporting program) 21 for realizing the harness information setting section 11, the simulation section 12 (including mechanical component position calculating section 121, harness position/shape calculating section 122, and three-dimensional image producing section 123), the display controlling section 13, the verification section 14, and the expansion section 15 of FIG. 1.

The CPU 10 reads the application program 21 from the memory 20 via the bus line 50, and then executes the program 21, thereby realizing the functions (will be detailed later) as the harness information setting section 11, the simulation section 12, the display controlling section 13, the verification section 14, and the expansion section 15, that is, the function as a harness design supporting apparatus of the present invention.

The above application program 21 is recorded in a computer-readable recording medium, such as a flexible disc, and a CD-ROM. The computer system 1 reads the program 21 from the recording medium, and sends the program to an internal storage apparatus (memory 20), or the external storage apparatus 70 to store the program therein. The program 21 may be recorded in a storage apparatus (recording medium) such as a magnetic disc, optical disc, and magneto-optical disc. In such a case, the program is sent from the recording medium to the computer system 1 via a communication network.

When the functions as the harness information setting section 11, the simulation section 12, the display controlling section 13, the verification section 14, and the expansion section 15 are realized, the program 21 stored in the internal storage apparatus (memory 20 in the present embodiment) is executed by a micro processor (CPU 10 in the present embodiment) of the computer. At this time, the computer system 1 may directly read the program 21 stored in a recording medium and then execute it.

Here, the "computer" is defined as a concept including hardware and an OS (Operating System), or hardware operating under control of an OS. Further, in cases where hardware is capable of operating by itself without the necessity of an OS, the hardware is equivalent to the "computer." The hardware includes at least a micro processor such as a CPU and a means for reading computer programs from recording media.

The application program 21 contains program codes that instruct the computer to function as the harness information setting section 11, the simulation section 12, the display controlling section 13, the verification section 14, and the expansion section 15. A part of these functions can be realized by the OS, not by the application program 21.

Further, as a recording medium used in the present embodiment of the present invention, not only the above-mentioned flexible disc, CR-ROM, DVD, magnetic disc, optical disc, and magneto-optical disc, but also various types of other computer-readable media, such as an IC card, ROM cartridge, magnetic tape, punch card, internal storage device (memory such as a RAM and a ROM), external storage device, and printed matter with any codes such as barcodes printed thereon, are also applicable.

Now, a description will made hereinbelow of the functions (as the harness information setting section 11, simulation section 12, display controlling section 13, verification section 14, and expansion section 15) realized by the CPU 10.

The harness information setting section 11 sets the aforementioned harness information 23 beforehand. It actually writes varying values, which are input from the outside through the keyboard 40, to the memory 20 as the harness information 23, or it sends the values to the simulation section 12. If libraries of connector components and clamp components are stored in advance in the external storage apparatus 70, as already described above, the harness information setting section 11 may select a connector component or a clamp component from the libraries in the external storage apparatus 70, in response to information input from the outside through the keyboard 40 and the mouse 41, thereby setting the starting and terminating positions of the harness and its attitude at these positions.

The simulation section 12 creates a three-dimensional mechanism model of a harness and of mechanical components based on the harness information 23 set by the harness information setting section 11 and on three-dimensional model data 22 of the mechanical components stored in the memory 20, and using the three-dimensional mechanism model, the simulation section 12 simulates motion of the harness in conjunction with motion of the mechanical components.

As will be described later with reference to FIG. 3 and FIG. 4, this simulation section 12 treats the harness as a three-dimensional model in which harness parts, obtained by dividing the harness into two or more divisions, are linked by three-degree-of-freedom rotational joints. In addition, as shown in FIG. 1, the simulation section 12 has the functions as the mechanical component position calculating section 121, the harness position/shape calculating section 122, and the three-dimensional image producing section 123. In addition, when recognizing a harness as a static element which has nothing to do with motion of mechanical components, the simulation section 12 treats the harness, which has been treated so far as a set of harness parts, as a single component.

Here, in order to simulate the motion of the mechanical components, the mechanical component position calculating section 121 calculates positions of the mechanical components at specific intervals based on the three dimensional data 22 of the mechanical components.

The harness position/shape calculating section 122 calculates the position and the shape of the harness based on the position of the mechanical components calculated by the mechanical component position calculating section 121 and on the harness information 23. As will be detailed later with reference to FIG. 4, the harness position/shape calculating section 122 approximately calculates the position and the shape of the harness using a Bezier curve, based on the starting and terminating positions of the harness and attitude information of the harness at these positions.

The three-dimensional image producing section 123 creates a three dimensional image of the harness and of the mechanical components based on the position of the mechanical components calculated by the mechanical component position calculating section 121, the position and the shape of the harness calculated by the harness position/shape calculating section 122, the harness information 23, and the three-dimensional model data 22 of the mechanical components, and then outputs the thus created three-dimensional image to the display controlling section 13 as the simulation result. The display controlling section 13 then controls the display 30 to show the three-dimensional image sent from the three-dimensional image producing section 123.

Figure 4:
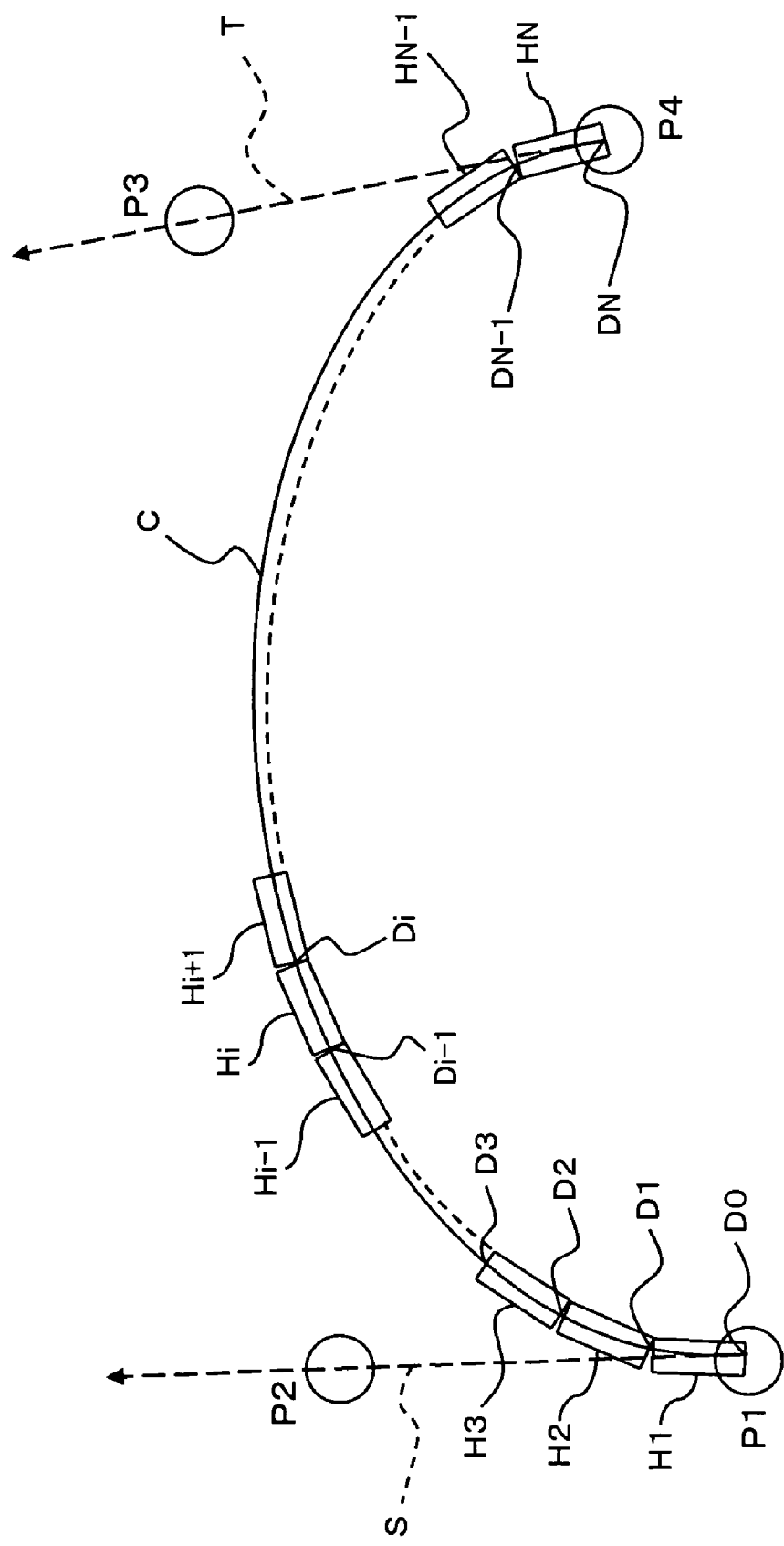
FIG. 4 is a view for describing a technique of modeling a harness of the present embodiment, and is also a view for describing an approximation technique for the position and the shape of a harness using a Bezier curve, which method is carried out by a harness position/shape calculating section of the present embodiment.

As shown in FIG. 4, the three-dimensional image producing section 123 connects the harness parts, which form a three dimensional model of the harness, along the Bezier curve obtained by the harness position/shape calculating section 122 as the position and the shape of the harness, thereby producing a three-dimensional image of the harness. The three dimensional image produced by the three-dimensional image producing section 123 has a cross-section shape which is contained in the harness information 23.

On the basis of the simulation result obtained by the simulation section 12, the verification section 14 performs dynamic verification of the harness based on the simulation result obtained by the simulation section 12. In the present embodiment, as will be detailed later, interference between the harness and the mechanical components, the length of the harness, and the curvature of the harness are verified. The verification result of the verification section 14 is, for example, shown on the display 30 under control of the display controlling section 13.

The expansion section 15 converts/expands the three dimensional model of the harness obtained as the simulation result of the simulation section 12 into a two-dimensional layout view (plan view), which is then output to the outside or stored in the memory 20 or the external storage apparatus 70.

In the present embodiment, property information (for example, connector, clamp, coating, signal line, FromTo list, etc.) of the harness is stored in advance in the memory 20 together with the harness information 23. In response to instructions given through the keyboard 40 and the mouse 41, the display controlling section 13 controls the display 30 to show thereon the property information along with an image of the harness.

Figure 7:
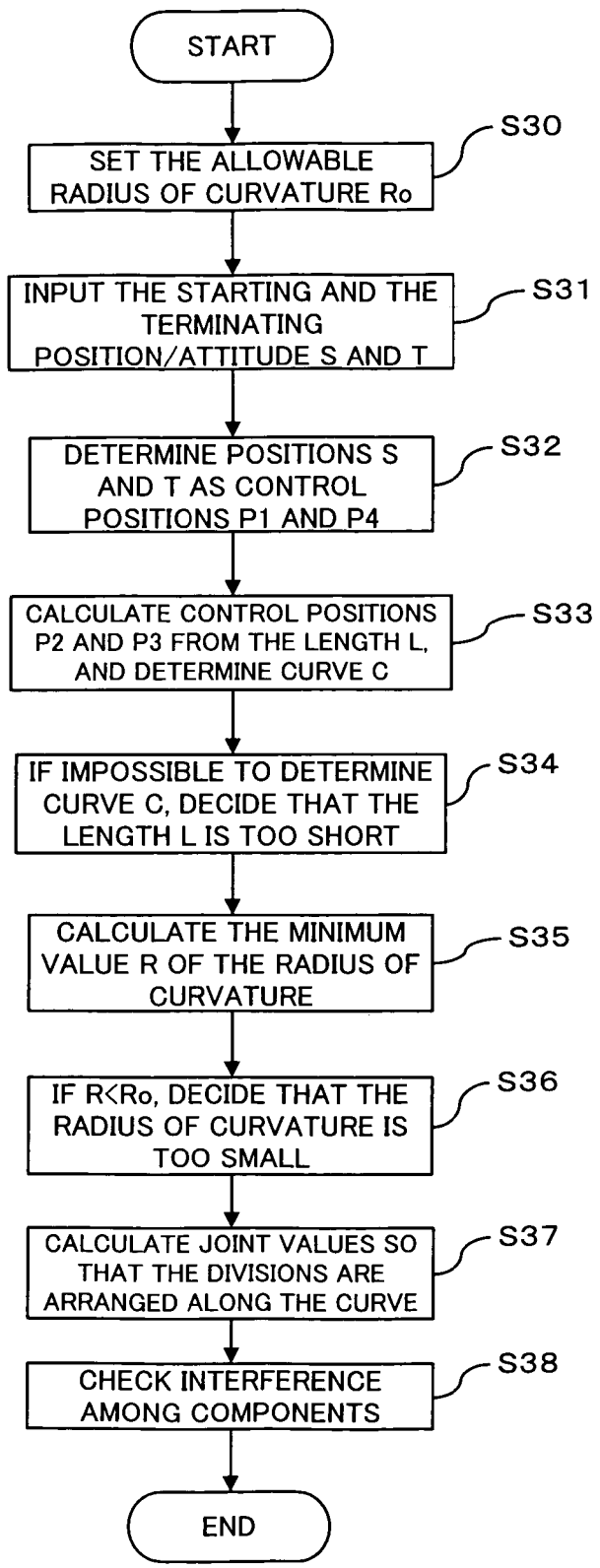
FIG. 7 is a flowchart for describing procedures that are performed when modeling (dynamic deformation) of a harness is performed in parallel with its dynamic verification.

[2] Operation of the Harness Design Supporting Apparatus of the Present Embodiment and Effects of the Same Referring to FIG. 3 and FIG. 7, a description will now be made of the operation of the harness design supporting apparatus of the present embodiment.

The present embodiment combines three-dimensional mechanism simulator technology and harness modeling technology, to realize dynamic verification and a reduced processing amount in harness design.

Here, the three-dimensional mechanism simulator technology, which is applied to the simulation section 12 of the present embodiment, is simulation technology which reproduces motion of a mechanism using a three-dimensional model. The simulation section (simulator) 12 designs a three-dimensional model of a harness while simulating it, whereby verification of motion of the harness is available.

In the harness modeling technology, a three-dimensional model of a harness needs to be deformed in real time. In order to perform the deformation simulation of the harness at high speed, the harness is modeled as multiple small components (harness parts) connected therebetween, as will be detailed later with reference to FIG. 3 and FIG. 4. At this time, adjacent small components are linked by three-degree-of-freedom rotational joints.

To simulate motion of the three-dimensional model of the harness in conjunction with motion of the mechanical component, the position and the shape of the whole harness is determined by the starting and the terminating points of the harness (will be described later with reference to FIG. 4). That is, assuming that the starting and terminating points of the harness are combined with mechanical components, the starting and the terminating points move as the mechanical components move, the harness being thereby deformed. This deformation is approximated using a Bezier curve, and angles of the joints (rotational joints) between the small components are adjusted so that the small parts are fitted along the Bezier curve.

As already mentioned above, other mechanical components than a harness are designed by the three-dimensional CAD apparatus 60 before the harness design supporting apparatus 1 initiates its operation. The three-dimensional model data which is designed by the three-dimensional CAD apparatus 60 is converted into polygon data to reduce the data amount, and is then stored in the memory 20 as three-dimensional model data 22.

The three-dimensional model data 22 contains not only the shape of each mechanical component but also the position/attitude information of the component and the relationship with other components.

The CPU 10 reads such three-dimensional model data 22, and uses its function as the three-dimensional image producing section 123 and the display controlling section 13 to control the display 30 to show thereon the three-dimensional model (three-dimensional image) of the mechanical components. User input apparatus such as mouse 41 and keyboard 40 are then used to define the joints and the mechanisms of the three-dimensional model, to model the harness, and to operate the mechanism. Since such reading and displaying of the three dimensional model and definition and operation of the three-dimensional model are capable of being performed by an existing three-dimensional mechanism simulator (three-dimensional mechanism simulation technology), explanation of these is omitted here, and a detailed description will be made hereinbelow of a technique for modeling a harness and verification technique.

[2-1] Multiple Connection Structure of a Harness Model

Figure 3:
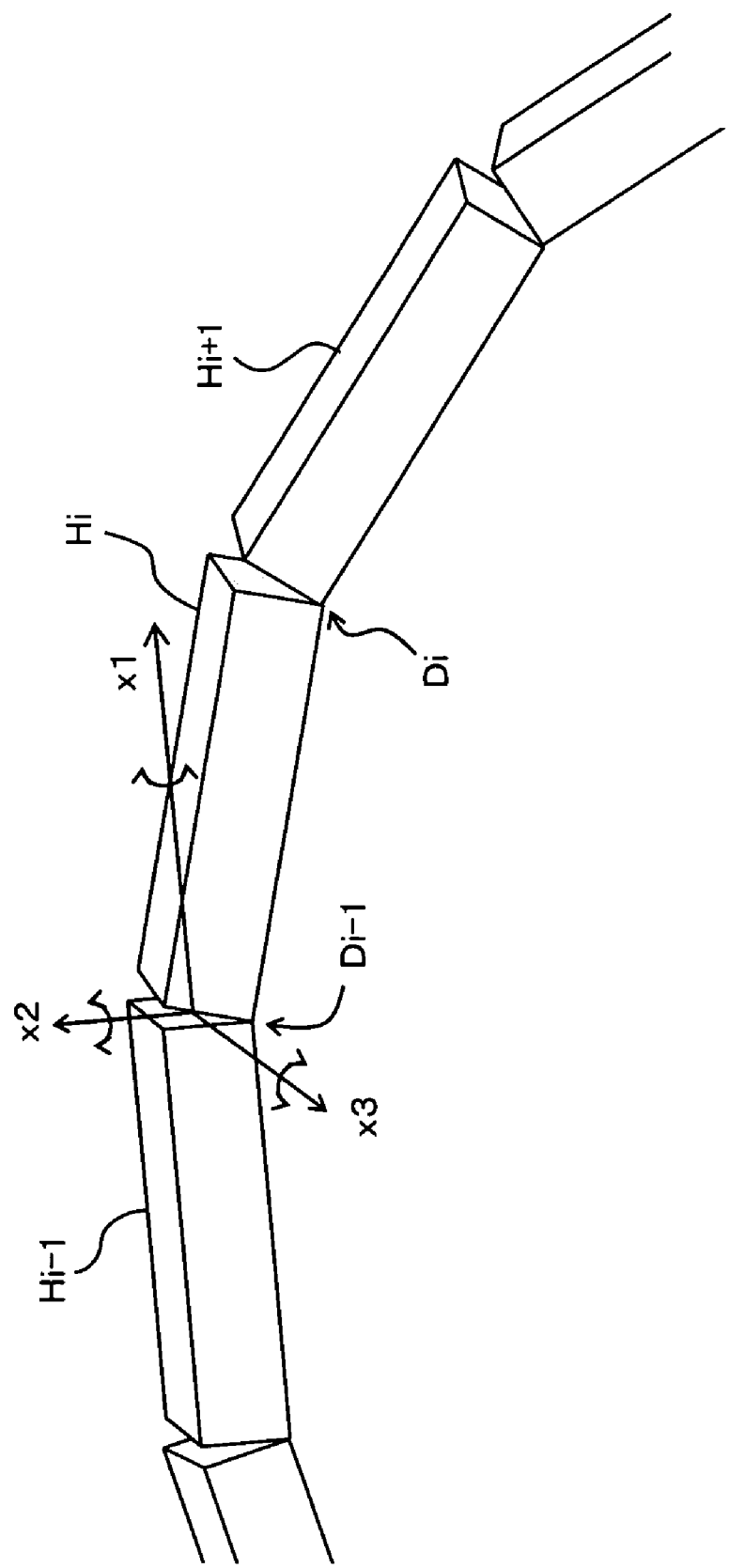
FIG. 3 is a view for describing a technique of modeling a harness of the present embodiment.

FIG. 3 and FIG. 4 are views for describing a technique for modeling a harness of the present embodiment.

As shown in FIG. 3 and FIG. 4, the harness model of the present embodiment is formed by multiple small components (harness parts) H1 through HN connected therebetween, and each of the small components has a simple shape such as a rectangular solid or a circular cylinder.

As shown in FIG. 3, connection portion (a divisional position of the harness) D$i$-1 between harness part H$i$-1 and H$i$ is given as a three-degree-of-freedom rotational joint, which connects between harness parts H$i$-1 and H$i$. The three-degree-of-freedom rotational axes of harness part H$i$-1 relative to harness part H$i$-1 are the following three axes: central axis x1 that extends in the lengthwise direction of harness part H$i$-1; axis x2 that is orthogonal both to axis x1 and to the upper face of harness part H$i$-1; and axis x3 which is orthogonal both to axes x1 and x2.

In this manner, since the harness is treated as a model in which harness parts H$i$-1 and H$i$ are linked by a three-degree-of-freedom rotational joint, it is possible to express bending in an arbitrary direction and a twist with this harness model.

The number (the number of harness parts) of divisions which the harness is divided into may be set as a default value, or may be set as harness information 23.

[2-2] Shape of the Harness

FIG. 4 is a view for describing an approximation technique for the position and the shape of a harness using a Bezier curve, which method is carried out by a harness position/shape calculating section 122 of the present embodiment.

The harness extends from one connector component to another connector component. As already described, such a harness is treated as a harness model in which multiple harness parts are connected. The starting and terminating positions of the harness, attitude of the harness at these positions (starting and terminating positions/attitude data S and T), the length L of the harness, the shape A of the cross section of the harness, and multiple connection structure data of the small parts (harness parts), are set for each harness as harness information 23. On the basis of the position/attitude data S and T and the length L contained in the harness information 23, the harness position/shape calculating section 122 determines a curve C corresponding to the position/attitude of the harness as shown in FIG. 4.

The three-dimensional image producing section 123 then connects harness parts having a specific cross-section shape A so that they are arranged along the curve C. As a result, a three-dimensional image of the harness is expressed.

Here, the starting and terminating positions/attitude data S and T are practically given as vector information as shown by the dotted arrows in FIG. 4.

The aforementioned curve C can be easily given by a cubic Bezier curve.

The cubic Bezier curve is uniquely defined by four points (control points) P1, P2, P3, and P4, as shown in FIG. 4. P1 and P4 are the starting and the terminating positions (corresponding to divisional positions D0 and DN), respectively, of the harness.

Next, on the basis of the attitude (the direction of the harness at the starting position P1 and the terminating position P4; the direction of the tangent line of the harness) of the harness at the starting point P1 and the terminating position P4, P2 and P3 are defined to be on the direction vectors S and T extending from P1 and P4.

Here, if P2 and P3 are shifted on the direction vector S and T, the shape of curve C is changed, and the length of the curve C is also changed. Thus, P2 and P3 are shifted to the positions such that the length of the curve C is equal to the length L determined by the harness information 23, whereby the shape of the curve C is determined.

At this time, if P2 and P3 are separately shifted, two parameters are necessary for determining the positions of P2 and P3. However, if P2 and P3 are shifted so that the distance (P1-P2) between P1 and P2 and the distance (P3-P4) between P3 and P4 are always a specific length of d, only one parameter, the length d, is necessary for determining the positions of P2 and P3.

[2-3] Operation of the Shape of the Harness

The shape of the harness (curve C) is easily changed by changing the starting and terminating positions of the harness and by changing attitude of the harness at these positions. That is, the starting and terminating points of the harness are connected to mechanical components (connector components in the present embodiment), whereby the position and the attitude of the starting and terminating points of the harness are changed in conjunction with the mechanical components, and the shape (curve C) of the harness is also changed.

In the present embodiment, as already described above, the mechanical component position calculating section 121 calculates positions of the mechanical components at specific intervals, and based on the calculated position of the mechanical components, the starting and terminating positions of the harness, which are in conjunction with motion of the mechanical components, are determined. On the basis of the thus determined starting and terminating positions, the harness position/shape calculating section 122 approximately calculates the shape (curve C) of the harness using a Bezier curve at specific intervals.

It is possible for a designer to input/change the length (the whole length) L of the harness through the keyboard 40 and the mouse 41, while seeing the display 30, to change the shape of the harness shown on the display. The designer can see the shape of the harness corresponding to the input length L on the display 30.

Further, the designer can also change the shape of the harness shown on the display 30 by dragging a point of the three-dimensional image of the harness shown on the display 30 using the mouse 41. A Bezier curve can be divided at an arbitrary position into two Bezier curves. Thus, it is possible to divide a Bezier curve, which approximately shows the shape of the harness, at a position on the harness (curve C) pointed to by the mouse 41, and two Bezier curves are newly calculated using the above position as starting and terminating positions of the new curves, so that the shape of the curve (that is, the shape of the harness) is changed. The designer can see the shape of the harness, to which the above change was performed, on the display 30.

Here, if a Bezier curve C is divided at every designated point thereon, the number of divisions is increased, the processing being thereby complicated. Thus, the shape of the Bezier curve may be changed so that it passes through designated points, by operating the positions of P2 and P3.

[2-4] Definition of the Cross-Section Shape

In the present embodiment, by defining the cross-section shape A of the harness contained in the harness information 23, the thickness of the harness to be modeled can be changed, and modeling appropriate for a flat cable can be performed. Further, since the definition of the shape A of the cross section of the harness is managed for each harness part, modeling can support a case where a type of harness is combined with another type of harness with a different thickness.

[2-5] Calculation of a Curvature

In a Bezier curve, it is possible to calculate curvatures at arbitrary positions on the curve. This makes it possible to detect a point at which the curvature is the largest (steepest) on the harness, and thus the degree of bending of the shape of the curvature can be verified. That is, by calculating a curvature every time the shape of the harness is changed, it is possible for the verification section 14 to perform dynamic verification of the curvature of the harness while mechanisms are being moved.

Here, when the shape of the harness is approximated using a Bezier curve, the curvature of the harness, instead of the length of the harness, may be defined. In this case, P2 and P3 are shifted on the direction vectors S and T, until P2 and P3 are determined so that the curvature of the curve C becomes a specific curvature, whereby the shape of the curve C is determined. At this time, P2 and P3 may be determined so that the curvature takes a minimum value, whereby the shape of the curve C is determined.

[2-6] Treating a Harness as a Single Component

When a harness is modeled as a set of multiple small parts (harness parts) connected therebetween, if the number of harnesses used in an object apparatus to be designed is increased, the number of components is significantly increased, and load of calculation processing is thus increased. However, generally speaking, all the harnesses do not move in conjunction with mechanical components. Since such harnesses which do not move in conjunction with mechanical components are not deformed at all, the harnesses, which have been treated so far as sets of harness parts, are treated as single components after the positions and the shapes of the harnesses are determined at initial setting. This makes it possible to reduce the number of components, thereby reducing calculation processing load.

[2-7] Combining and Dividing of Harnesses

Generally speaking, harnesses are combined and divided repeatedly in a complicated manner. For modeling this, two or more harnesses are capable of being connected to the starting and terminating points of a harness.

[2-8] Interference Check

In the present embodiment, it is possible to manage small components (harness parts), forming a harness, in the same data format as that of component data (three-dimensional model data 22 of mechanical components) on a three-dimensional mechanism simulator. Thus, an interference check function (verification section 14) is incorporated in the three-dimensional mechanism simulator (CPU 10), thereby making it possible to check interference between mechanical components and a harness on a three-dimensional model. This makes it possible to verify, for example, whether or not a space for the harness is sufficiently reserved. Further, the verification section 14 performs interference checking while mechanisms are being moved, so that whether or not the harness is caught or pinched somewhere is dynamically verified.

[2-9] Verification of the Length

As already described, when the shape of a harness is changed while mechanisms are being moved, the shape of the harness is calculated so that the length of the harness (curve C) is fixed (for example, a specific length of L). That is, in response to change in starting point P1 and terminating position P4, positions P2 and P3 are determined so that the length of the curve C is a specific length L.

If starting point P1 and terminating point P4 are separated so far from each other that the harness cannot connect therebetween as mechanisms move, it is impossible to determine P2 and P3. This situation, the length of the harness being too short, is detected by verification section 14, and is notified to a user (designer) through display 30. In this manner, dynamic verification of the length of a harness is performed.

[2-10] Two-Dimensional Layout Expansion

After a harness is designed as a three-dimensional model, it is necessary to expand the three-dimensional model of the harness, which is obtained as a simulation result by the simulation section 12, into a two-dimensional view for manufacturing. At this time, expanding a harness which branches and combines in a complicated manner into a two-dimensional view will raise the necessity of a trial and error process.

The present embodiment employs a method (see, for example, Jun NAGUMO and Jiro TANAKA: "View PP": *Visualization of Program Execution based on the Animated Graph Structure*, in the collected papers of the 14th convention of Japan Society for Software Science and Technology, pp. 17-20. September in 1997) in which a branching point of a harness is regarded as a node of a graph and a three-dimensional graph layout is expanded into a two-dimensional plane. Using this method, expansion section 15 automatically expands a three-dimensional model of a harness into a two-dimensional layout view, and creates/outputs the two-dimensional layout view.

[2-11] Management of Signal Information

In the present embodiment, information, such as a connector, clamp, coating film, signal line, and FromTo list, is obtained as property data (property information) of a harness, and such property data is shown on display 30 together with a three-dimensional image of the harness. This makes it possible for a designer to check specifications of the harness while seeing the three-dimensional model of the harness on the display 30.

Further, if a FromTo list (wiring information for signals) is displayed on the display 30 in association with a three-dimensional model, it is possible for a designer to check where in the three dimensional model the signal passes through. This makes it possible for the designer to check the distance between a noise source, such as a power line, and a signal line. Here, a function of automatically calculating and showing the minimum distance between the noise source and a signal line may be prepared.

Further, the above property data can contain the physical property (density and so on) of the harness. In such a case, the whole length and the weight of the harness are automatically calculated.

[2-12] Libraries

The starting point and the terminating point of a harness model are often provided on a connector component or a clamp component, since these points often serve as passing points and relay points of the harness. Thus, information about connector components/clamp components are stored as a library in external storage apparatus 70, and where in each component and in which attitude a harness is to be connected/secured are stored in the libraries. With this arrangement, a designer only needs to use keyboard 40 and mouse 41 to select components to be placed at the starting and terminating points of a harness and to place the selected components on a three-dimensional model, to define the starting and terminating positions of the harness and the attitude of the harness at these points.

[2-13] Operation of the Harness Design Supporting Apparatus of the Present Embodiment Referring to the flowcharts of FIG. 5 through FIG. 7, a description will be made hereinbelow of an operation of a harness design supporting apparatus 1 of the present embodiment.

First of all, referring to the flowchart (step S11 through step S20) of FIG. 5, procedures for modeling a harness at initial setting will be described.

When modeling of a harness is initiated at the beginning of harness design, the following data is set as harness information 23 (step S11 through step S14): the position/attitude data S of the starting point of a harness; the position/attitude data T of the terminating point of the harness; the length L of the harness; and the cross-section shape A of the harness. The harness information 23 can be input by a designer through keyboard 40 and mouse 41, or can be input from a recording medium such as a flexible disk via a driver.

Then, as already described with reference to FIG. 4, after setting the positions of S and T to control positions P1 and P4 respectively (step S15), the positions of P2 and P3 on the direction vector S and T are determined based on the specific length L, the shape of curve C thereby being determined (step S16).

After that, the thus determined curve C is divided into N divisions (divisional curves), and the dividing points are designated as Di (i=0 through N) (step S17). Here, dividing positions D0 and DN correspond to the starting and terminating points of the harness, respectively.

A component (harness part) Hi (i=1 through N) having a cross sectional shape A and a length of (Di-Di−1) is produced for each divisional curve (step S18), and three-degree-of-freedom rotational joints, as shown in FIG. 3, are added between adjacent components Hi and Hi+1 (step S19). The joint value of each rotational joint is calculated so that each component Hi is arranged along curve C (step S20), and modeling of the harness is ended.

Next, referring to the flowchart (step S31 through step S33 and step S37) of FIG. 6, a description will be made hereinbelow of dynamic deformation procedures (harness modeling procedures) for the position and the shape of a harness of the present embodiment. Here, dynamic verification of the harness by verification section 14 is not performed.

Figure 5:
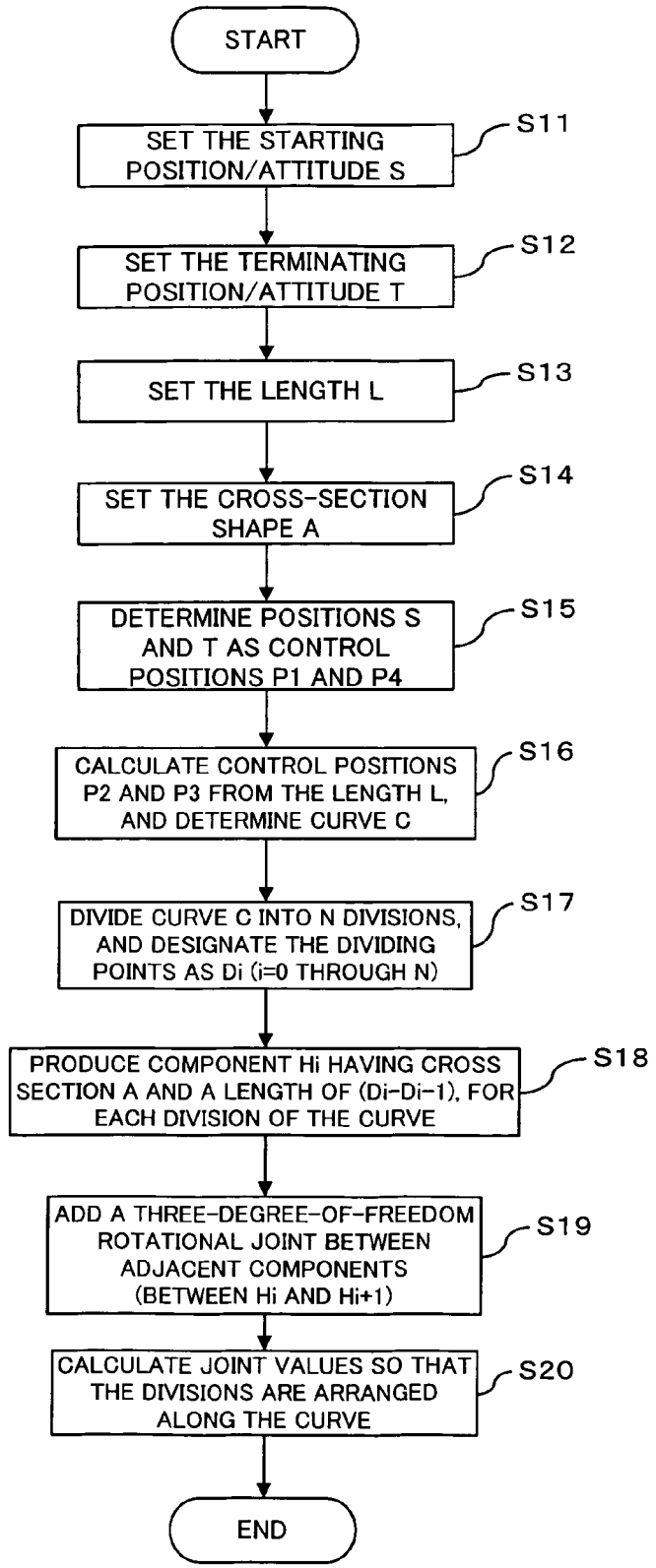
FIG. 5 is a flowchart for describing procedures of modeling (initial setting procedures) a harness of the present embodiment.
Figure 6:
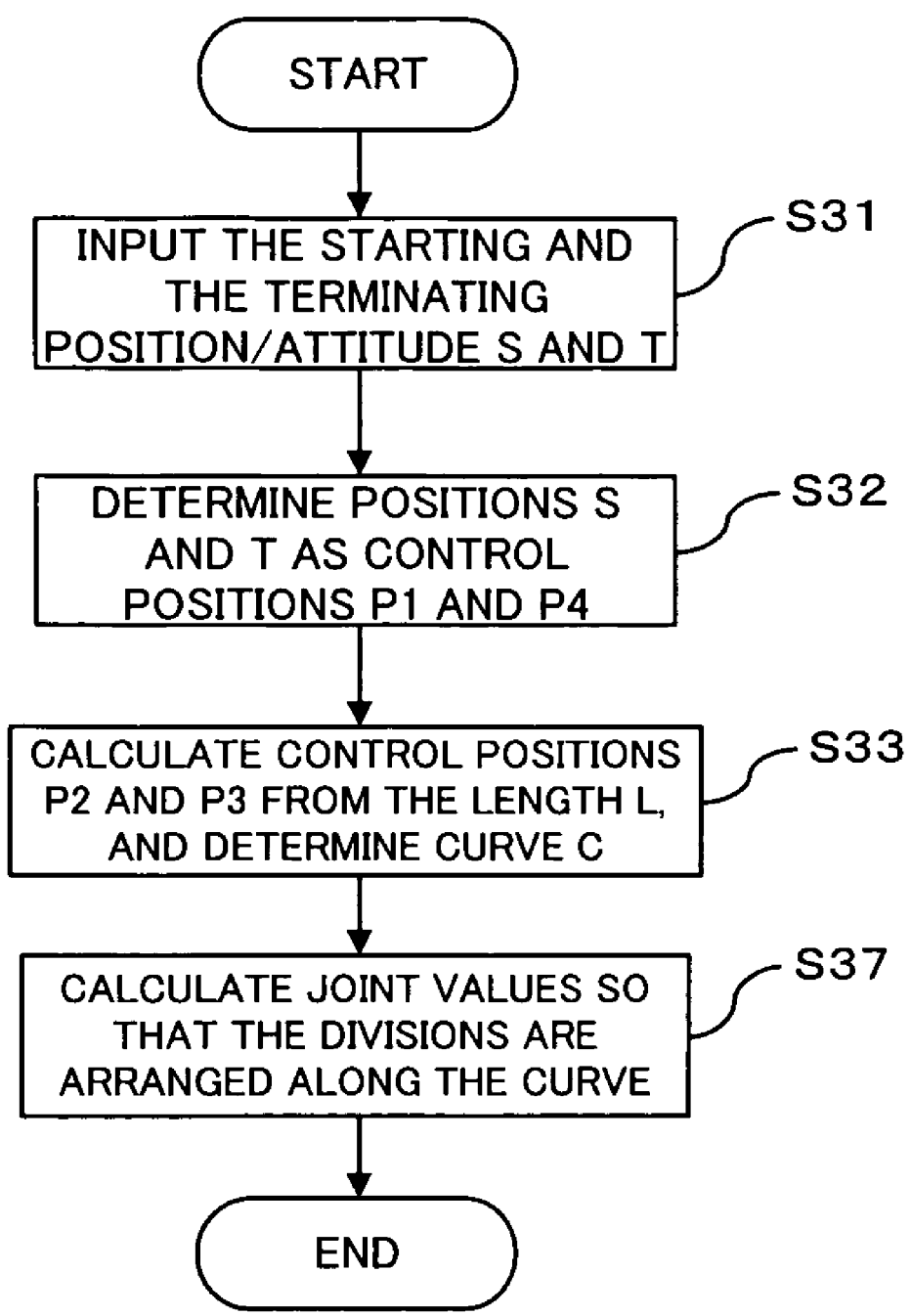
FIG. 6 is a flowchart for describing procedures of modeling (dynamic deformation of the position and the shape of a harness) a harness of the present embodiment.

After completion of initial setting of the harness model by the procedures of FIG. 5, positions of the mechanical components are calculated at predetermined intervals. If the starting and terminating positions of the harness change as the positions of the mechanical components change, the procedures of FIG. 6 are performed.

If positions and attitude S and T of the starting and terminating points of the harness are newly input in response to the change in position of the mechanical components (step S31), the new positions of S and T are set to control positions P1 and P4, respectively (step S32). After that, positions P2 and P3 on the direction vector S and T are determined based on the specific length L, the shape of curve C thereby being determined (step S33). After this, the joint value of each rotational joint is calculated so that each of the components (harness parts) Hi, produced at step S18 of FIG. 5, are arranged along the curve C determined at step S33 (step S37), and the dynamic modeling of the harness is ended.

Finally, referring to the flowchart (step S30 through step S38) of FIG. 7, a description will be made hereinbelow of procedures carried out when dynamic verification of the harness is performed concurrently with modeling (dynamic deformation) of the harness. Here, dynamic verification procedures (step S30, step S34 through step S36, and step S38) by verification section 14 are added to dynamic deformation procedures (step S31 through step S33 and step S37) described above with reference to FIG. 6.

In the beginning, for the purpose of curvature verification, an allowable radius of curvature Ro of the object harness to be modeled is set beforehand (step S30). In a similar manner to the above description, when the starting and terminating positions and attitudes S and T of the harness are newly input in response to the change in position of the mechanical components (step S31), the new positions of S and T are set to control points P1 and P4, respectively (step S32), and the positions of P2 and P3 on direction vectors S and T are determined based on the specific length L, the shape of curve C thereby being determined (step S33).

At this time, if the shape of the curve C cannot be determined at step S33, the specific length L of the harness is evaluated to be too short, which is notified to the designer through display 30 (step S34).

On the other hand, if the shape of the curve C is determined at step S33, the minimum value R of the radius of curvature of the curve C is calculated (step S35). If the minimum value R is smaller than the allowable radius of curvature Ro, it is evaluated that the radius of curvature of the curve C is too small, which is notified to the designer through display 30 (step S36).

If the minimum value R is equal to or larger than the allowable radius of curvature Ro, the joint value of each rotational joint is calculated so that each component (harness part) Hi is arranged along the curve C determined at step S33 (step S37), and interference check between the components (interference check between the harness parts and the mechanical components) is performed. If any interference is caused, it is notified to the designer through the display 30 (step S38). After that, the dynamic modeling and the dynamic verification of the harness is ended.

[3] Effects and Benefits of the Harness Design Supporting Apparatus of the Present Embodiment The following are effects and benefits of the harness design supporting apparatus 1 of the present embodiment.

[3-1] Using a three-dimensional mechanism model created based on the harness information 23 and the three-dimensional model data 22 of mechanical components, motion of the harness is simulated in conjunction with motion of the mechanical components, and the simulation result is shown on the display 30 as motion of the harness and motion of the mechanical components. Thus, at design of the harness, it is possible for a designer to check the motion of the harness accompanying the motion of the mechanical components. This provides the designer with an environment where dynamic verification of harness design is available, so that efficiency of harness design is improved.

[3-2] As shown in FIG. 3 and FIG. 4, a harness is treated as a three-dimensional model in which multiple harness parts are linked by three-degree-of-freedom rotational joints, and this makes it possible to treat the harness as a simple three-dimensional model. Accordingly, motion of the harness accompanying the motion of the mechanical components is simulated in a simple manner, so that the motion of the harness is simulated in real time without increasing the amount of processing. Further, since the motion of the harness is shown in real time as a three-dimensional image on the display 30, the designer can see the motion of the harness in real time in a three-dimensional manner, so that his understanding of the harness is improved.

[3-3] Use of the starting and terminating positions of the harness and attitude of the harness at these positions, contained in the harness information 23, facilitates calculation of the position and the shape of the harness. In particular, by approximating the position and the shape of the harness by a Bezier curve, it is possible to obtain the position and the shape of the harness more easily in a shorter time. Further, as shown in FIG. 4, by connecting harness parts, which form a three-dimensional model of the harness, so that they are arranged along the obtained Bezier curve C, a three dimensional image of a harness is created extremely easily in a short time.

[3-4] The harness information setting section 11 sets the shape of the cross section of the harness as harness information 23, and the three-dimensional image producing section 123 creates a three-dimensional image of the harness according to the shape of the cross section of the harness contained in the harness information 23. This makes it possible to arbitrarily specify the shape of the cross section of the harness to be simulated, so that harnesses varying in thickness and harnesses such as flat cables can also be simulated. Further, provided that the shape of the cross section of each harness part is specified, if a harness is combined with another harness, so that the thickness and the shape of the harness are changed, its simulation is still available.

[3-5] If the simulation section 12 recognizes that the harness is a static component which has nothing to do with motion of the mechanical components, it treats the harness, which has been treated so far as multiple harness parts, as a single component. As for harnesses which do not move in conjunction with the mechanical components, that is, as for harnesses which do not deform at all if the mechanical components move, it is not necessary to simulate the motion of the harnesses, and the harnesses can be treated as single components. As a result, it is not necessary to store information of multiple harness parts, and the number of components to be simulated is decreased, so that the memory capacity is effectively used, and processing can be performed at high speed.

[3-6] The verification section 14 which performs dynamic verification (for example, verification of interference between a harness and mechanical components, the length of the harness, and the curvature of the harness) of the harness based on the simulation result obtained by the simulation section 12 is provided, so that dynamic verification is carried out concurrently with simulation. A designer can thereby perform verification of various types of problems immediately, and the verification result is immediately reflected in harness design.

[3-7] The expansion section 15 which converts and expands a three-dimensional model of a harness obtained as a simulation result by the simulation section 12 is provided, so that it is not necessary for a designer to expand a three dimensional model of the harness into a two-dimensional plan view. Such a two-dimensional plan view is automatically obtained, whereby the convenience of a designer is significantly improved.

[3-8] Property information of a harness is obtained, and the property information is shown on the display 30 together with an image of the harness. It is thus possible for a designer to recognize signals transmitted over the harness and various types of information, such as from where to where the harness is arranged, while checking the motion of the harness, so that the convenience of the designer is further improved.

[3-9] Libraries in which information about connector components/clamp components is stored together with information about where in the connector components/clamp components a harness is to be connected and information about attitude of the harness in the position, are prepared in, for example, the external storage apparatus 70. A designer selects a connector component/clamp component to which a harness is to be connected or secured, whereby the starting position and the terminating position of the harness and attitude of the harness at these positions are set as harness information. With this arrangement, it is no longer necessary for a designer to input/set the starting position and the terminating position of the harness and attitude of the harness at these positions, so that setting of harness information is facilitated.

[4] Others

The present invention should by no means be limited to the above-illustrated embodiment, and various changes or modifications may be suggested without departing from the gist of the invention.

INDUSTRIAL APPLICABILITY

As described above, using a three-dimensional mechanism model which is created based on harness information and three-dimensional model data of mechanical components, motion of a harness is simulated in conjunction with motion of the mechanical components, and the simulation result is shown on a display as motion of the harness and motion of the mechanical components. With this arrangement, when designing a harness, a designer is able to check in real time motion of the harness accompanying motion of mechanical components, without increasing the amount of processing. This provides the designer with an environment where dynamic verification of harness design is available, so that efficiency of harness design is improved.

Hence, the present invention is suitable for use in placement design of various kinds of flexible and pliable members.

For example, the present invention is applicable to design and development of printers, automobiles, machine tools, and industrial robots, in which cables and wires for supplying signals and electric power are incorporated, and is also applicable to design and development of piping and rubber hoses. Thus, the usefulness of the present invention is very high.

What is claimed is:

1. A harness design supporting apparatus for supporting placement design of a harness which is to be incorporated in an object apparatus, said apparatus comprising:
   a mechanism information storing unit which stores in advance three-dimensional model data of a mechanical component, other than the harness, of the object apparatus;
   a harness information setting section which sets information about the harness as harness information;
   a simulation section which creates a three-dimensional mechanism model of the harness and of the mechanical component based on the harness information, which is set by said harness information setting section, and on the three-dimensional model data of the mechanical component stored in said mechanism information storing unit, and which simulates motion of the harness in conjunction with motion of the mechanical component using the three-dimensional mechanism model;
   a display which displays motion of the harness and motion of the mechanical component; and
   a display controlling section which controls said display to show thereon the simulation result obtained by said simulation section as motion of the harness and motion of the mechanical component.

2. A harness design supporting apparatus as set forth in claim 1, wherein said simulation section treats the harness as a three-dimensional model in which a plurality of harness parts, obtained by dividing the harness, are linked by three-degree-of-freedom rotational joints.

3. A harness design supporting apparatus as set forth in claim 2,
   wherein said simulation section includes:
   a mechanical component position calculating section which calculates the position of the mechanical component at specific intervals based on three-dimensional model data of the mechanical component, for simulation of motion of the mechanical component;
   a harness position/shape calculating section which calculates the position and the shape of the harness based on the position of the mechanical component calculated by said mechanical component position calculating section and on the harness information set by said harness information setting section; and
   a three-dimensional image producing section which produces a three-dimensional image of the mechanical component and of the harness based on the following: the position of the mechanical component calculated by said mechanical component position calculating section; the position and the shape of the harness calculated by said harness position/shape calculating section; the harness information set by said harness information setting section; and the three-dimensional model data of said mechanical component, and which outputs the three-dimensional image as the simulation result, and
   wherein said display controlling section controls said display to display thereon the three-dimensional image obtained from said three-dimensional image producing section.

4. A harness design supporting apparatus as set forth in claim 3, wherein said harness position/shape calculating section approximately calculates the position and the shape of the harness using a Bezier curve, based on the starting position and the terminating position of the harness and on attitude information of the harness at these positions, said starting and terminating positions and said attitude information being included in the harness information.

5. A harness design supporting apparatus as set forth in claim 4, wherein said three-dimensional image producing section produces the three-dimensional image of the harness by connecting the plurality of harness parts, which form a three dimensional model of the harness, so that the harness parts are arranged along the Bezier curve, which is obtained by said harness position/shape calculating section as the position and the shape of the harness.

6. A harness design supporting apparatus as set forth in claim 3,
wherein said harness information setting section sets the shape of the cross section of the harness as the harness information, and
wherein said three-dimensional image producing section produces the three-dimensional image of the harness according to the shape of the cross section of the harness included in the harness information.

7. A harness design supporting apparatus as set forth in claim 2, wherein if said simulation section recognizes that the harness is a static element which has nothing to do with motion of the mechanical component, said simulation section treats the harness, which has been treated so far as a set of harness parts, as a single element.

8. A harness design supporting apparatus as set forth in claim 1, further comprising a verification section which performs dynamic verification of the harness based on the simulation result obtained by said simulation section.

9. A harness design supporting apparatus as set forth in claim 1, further comprising an expansion section which converts/expands the three-dimensional model of the harness, obtained as the simulation result, by said simulation section, into a two-dimensional layout view.

10. A harness property information of the harness is obtained, and said display controlling section controls said display to show thereon the property information together with an image of the harness.

11. A harness design supporting apparatus as set forth in claim 1,
wherein a library is prepared in advance which stores information about connector elements, to which the harness is connected, together with information about a connection position of the harness in each of the connector elements and about attitude of the harness at that position, and
wherein said harness information setting section sets the starting and terminating positions of the harness and the attitude of the harness at these positions as the harness information, by selecting one of the connector elements, to which the harness is to be connected, stored in the library.

12. A harness design supporting apparatus as set forth in claim 1,
wherein a library is prepared in advance which stores information about clamp elements, which clamps the harness, together with information about a clamp position of the harness in each of the clamp elements and about attitude of the harness at that position, and
wherein said harness information setting section sets a position which the harness passes through and the attitude of the harness at that position as the harness information, by selecting one of the clamp elements, which is to clamp the harness, stored in the library.

13. A harness design supporting method for supporting placement design of a harness which is to be incorporated in an object apparatus, said harness design supporting method comprising:
storing in advance three-dimensional model data of a mechanical component, other than the harness, of the object apparatus;
setting information about the harness as harness information;
simulating motion of the harness in conjunction with motion of the mechanical component using a three-dimensional mechanism model of the harness and of the mechanical component, which model is created based on the harness information and on the three-dimensional model data of the mechanical component; and
displaying the simulation result on a display as motion of the harness and motion of the mechanical component.

14. A harness design supporting method as set forth in claim 13, wherein the harness is treated as a three-dimensional model in which a plurality of harness parts, obtained by dividing the harness, are linked by three-degree-of-freedom rotational joints.

15. A harness design supporting method as set forth in claim 14,
wherein the simulating of the motion of the harness in conjunction with the motion of the mechanical component includes:
calculating the position of the mechanical component at specific intervals based on three-dimensional model data of the mechanical component, for simulation of motion of the mechanical component;
calculating the position and the shape of the harness based on the position of the mechanical component and on the harness information; and
producing and outputting a three-dimensional image of the mechanical component and of the harness based on the position of the mechanical component, on the position and the shape of the harness, and on the harness information, and
wherein the three-dimensional image is displayed on the display.

16. A harness design supporting method as set forth in claim 15, wherein the position and the shape of the harness is approximately calculated using a Bezier curve, based on the starting position and the terminating position of the harness and on attitude information of the harness at these positions, said starting and terminating positions and said attitude information being included in the harness information.

17. A harness design supporting method as set forth in claim 16, wherein the three-dimensional image of the harness is produced by connecting the plurality of harness parts, which form a three dimensional model of the harness, so that the harness parts are arranged along the Bezier curve, which is obtained as the position and the shape of the harness.

18. A computer-readable recording medium which stores therein a harness design supporting program for a computer to support placement design of a harness which is to be incorporated in an object apparatus, wherein the program instructs the computer to function as the following:
a harness information setting section which sets information about the harness as harness information;
a simulation section which creates a three-dimensional mechanism model of the harness and of the mechanical component based on the harness information, which is set by the harness information setting section, and on the three-dimensional model data of the mechanical component, other than the harness, of the object apparatus, and which simulates motion of the harness in conjunction with motion of the mechanical component using the three-dimensional mechanism model; and a display controlling section which controls a display to show thereon a simulation result obtained by the simulation section as motion of the harness and motion of the mechanical component.

19. A computer-readable recording medium as set forth in claim 18, wherein the program instructs the computer to make the simulation section treat the harness as a three-dimensional model in which a plurality of harness parts, obtained by dividing the harness, are linked by three-degree-of-freedom rotational joints.

20. A computer-readable recording medium as set forth in claim 19, wherein when the program instructs the computer to function as the simulation section, the program instructs the computer to function as the following:

a mechanical component position calculating section which calculates the position of the mechanical component at specific intervals based on three-dimensional model data of the mechanical component, for simulation of motion of the mechanical component;

a harness position/shape calculating section which calculates the position and the shape of the harness based on the position of the mechanical component calculated by the mechanical component position calculating section and on the harness information set by the harness information setting section; and a three-dimensional image producing section which produces a three-dimensional image of the mechanical component and of the harness based on the following: the position of the mechanical component calculated by the mechanical component position calculating section; the position and the shape of the harness calculated by the harness position/shape calculating section; the harness information set by the harness information setting section; and the three-dimensional model data of the mechanical component, and which outputs the three-dimensional image as the simulation result, and wherein the program instructs the computer to make the display controlling section control the display to display thereon the three-dimensional image obtained from the three-dimensional image producing section.

* * * * *

UNITED STATES PATENT AND TRADEMARK OFFICE
CERTIFICATE OF CORRECTION

PATENT NO.        : 7,480,596 B2
APPLICATION NO. : 11/032160
DATED             : January 20, 2009
INVENTOR(S)       : Masayoshi Hashima et al.

It is certified that error appears in the above-identified patent and that said Letters Patent is hereby corrected as shown below:

Column 17, Line 41, after "A harness" insert --design supporting apparatus as set forth in claim 1, wherein--.

Signed and Sealed this

Seventh Day of April, 2009

JOHN DOLL
*Acting Director of the United States Patent and Trademark Office*